United States Patent
Kitaguchi

(10) Patent No.: US 10,035,283 B2
(45) Date of Patent: Jul. 31, 2018

(54) MANUFACTURING METHOD OF HONEYCOMB STRUCTURE AND HONEYCOMB FORMED BODY

(71) Applicant: NGK INSULATORS, LTD., Nagoya (JP)

(72) Inventor: Daniel Yukichi Kitaguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 162 days.

(21) Appl. No.: 15/013,159

(22) Filed: Feb. 2, 2016

(65) Prior Publication Data
US 2016/0243724 A1    Aug. 25, 2016

(30) Foreign Application Priority Data
Feb. 24, 2015   (JP) .................................. 2015-033601

(51) Int. Cl.
C04B 38/00        (2006.01)
C04B 35/64        (2006.01)
(Continued)

(52) U.S. Cl.
CPC .............. *B28B 3/20* (2013.01); *B01D 35/005* (2013.01); *B01J 35/04* (2013.01); *B24B 5/50* (2013.01);
(Continued)

(58) Field of Classification Search
CPC ..... C04B 33/32; C04B 35/64; C04B 38/0006; C04B 38/0009
(Continued)

(56) References Cited

U.S. PATENT DOCUMENTS 4,519,820 A * 5/1985 Oyobe ............... B01D 46/2407
                                                 159/DIG. 10
4,786,542 A * 11/1988 Yasuda ................... C04B 33/32
                                                 156/89.22
(Continued)

FOREIGN PATENT DOCUMENTS

JP       2000-274954 A1   10/2000
JP       2008-012786 A1    1/2008
(Continued)

OTHER PUBLICATIONS

European Office Action, European Application No. 16155256.7, dated Jun. 20, 2017 (4 pages).
(Continued)

*Primary Examiner* — Erin Snelting
(74) *Attorney, Agent, or Firm* — Burr & Brown, PLLC

(57) ABSTRACT

A manufacturing method of a honeycomb structure includes a forming step of forming a honeycomb formed body having partition walls defining a plurality of cells, a convex wall portion forming step of forming a convex wall portion in the obtained honeycomb formed body, a mounting step of directing downward one end face on which the convex wall portion is formed and mounting the honeycomb formed body on a shelf plate, a firing step of firing the honeycomb formed body mounted on the shelf plate, to form a honeycomb fired body, and a circumference grinding step of grinding a circumferential surface of the honeycomb fired body, to remove the convex wall portion.

5 Claims, 5 Drawing Sheets

(51) Int. Cl.
  *B28B 3/20* (2006.01)
  *B28B 11/12* (2006.01)
  *B28B 11/08* (2006.01)
  *B01J 35/04* (2006.01)
  *B01D 35/00* (2006.01)
  *B28B 11/24* (2006.01)
  *C04B 33/32* (2006.01)
  *B24B 5/50* (2006.01)

(52) U.S. Cl.
  CPC .............. *B28B 11/08* (2013.01); *B28B 11/12* (2013.01); *B28B 11/243* (2013.01); *B28B 11/248* (2013.01); *C04B 33/32* (2013.01); *B28B 2003/203* (2013.01)

(58) Field of Classification Search
  USPC .................................. 264/605–609, 671–673
  See application file for complete search history.

(56) References Cited

U.S. PATENT DOCUMENTS

| | | | | |
|---|---|---|---|---|
| 5,149,264 A | * | 9/1992 | Horikawa | B28B 11/243 432/2 |
| 5,256,347 A | * | 10/1993 | Miyahara | B01D 39/2075 264/40.6 |
| 5,316,710 A | * | 5/1994 | Tasaki | C04B 35/64 264/630 |
| 5,529,732 A | * | 6/1996 | Ideguchi | C04B 35/195 264/607 |
| 7,488,412 B2 | * | 2/2009 | Abe | B01D 46/0024 208/179 |
| 7,601,195 B2 | * | 10/2009 | Ichikawa | B01D 46/2474 264/630 |
| 2006/0165956 A1 | | 7/2006 | Souda | |
| 2008/0116621 A1 | * | 5/2008 | Brennan | F27B 9/10 264/606 |
| 2008/0142149 A1 | * | 6/2008 | Noguchi | C04B 35/195 156/89.22 |
| 2008/0233345 A1 | | 9/2008 | Allen | |
| 2012/0013052 A1 | * | 1/2012 | Schumann | F27D 5/00 264/629 |
| 2014/0131926 A1 | * | 5/2014 | Geismar | C04B 33/32 264/605 |
| 2016/0137558 A1 | * | 5/2016 | Watanabe | F27D 3/12 264/630 |
| 2017/0274365 A1 | * | 9/2017 | Kitaguchi | B01J 35/04 |

FOREIGN PATENT DOCUMENTS

JP    2010-221163 A    10/2010
WO    2006/035674 A1    4/2006

OTHER PUBLICATIONS

Extended European Search Report (Application No. 16155256.7) dated Jul. 29, 2016.

* cited by examiner

MANUFACTURING METHOD OF HONEYCOMB STRUCTURE AND HONEYCOMB FORMED BODY

The present application is an application based on JP 2015-033601 filed on Feb. 24, 2015 with the Japan Patent Office, the entire contents of which are incorporated herein by reference.

BACKGROUND OF THE INVENTION

Field of the Invention

The present invention relates to a manufacturing method of a honeycomb structure, and a honeycomb formed body. More particularly, it relates to a manufacturing method of a honeycomb structure in which an unfired honeycomb formed body extruded by using an extruder is fired in a firing furnace, and a honeycomb formed body.

Description of the Related Art

Heretofore, a honeycomb structure made of ceramics has broadly been used in a use application such as a car exhaust gas purifying catalyst carrier, a diesel particulate removing filter, or a heat reservoir for a burning device. The honeycomb structure made of the ceramics (hereinafter simply referred to as "the honeycomb structure") is manufactured by preparing a forming raw material (a kneaded material), extruding the material into a desirable honeycomb shape by use of an extruder, raw-cutting, drying and finish-cutting the material to form a honeycomb formed body, and subjecting the honeycomb formed body to a firing step of firing the honeycomb formed body at a high temperature.

In the above firing step, the honeycomb formed body is mounted on a shelf plate in a state where one end face of the honeycomb formed body is directed downward, and the honeycomb formed body is thrown together with the shelf plate into a firing furnace. At this time, for the purpose of preventing the honeycomb formed body from being adhered to the shelf plate, suitably keeping end faces of the honeycomb structure to be formed and preventing a disadvantage such as end face crack from being generated, a firing support plate called "a setter" is usually interposed between the shelf plate and the honeycomb formed body. As this setter, for example, a sliced piece of the honeycomb structure obtained by firing the honeycomb formed body is used, and the setter is repeatedly usable.

However, when the setter is repeatedly used, cracks or the like are generated, and hence a press-molded and fired ceramic raw material called "a pressed setter" is used, and is also repeatedly usable (e.g., see Patent Document 1). Such setters are generically called "a firing setter". In addition, especially in a case where the honeycomb formed body including thin cell partition walls or the honeycomb formed body having a large diameter is fired, a firing raw setter (hereinafter simply referred to as "the raw setter") obtained by slicing an unfired honeycomb formed body made of the same material as in the honeycomb formed body is used in the firing step (e.g., see Patent Document 2). It is to be noted that in the present description, the extruded body before fired will be defined as "the honeycomb formed body", and the fired honeycomb formed body will be defined as "the honeycomb structure".

[Patent Document 1] JP-A-2000-274954
[Patent Document 2] WO 2006/035674

SUMMARY OF THE INVENTION

An extruded honeycomb formed body performs a firing shrinkage along a cell longitudinal direction and a direction perpendicular to the cell longitudinal direction in a firing step. Consequently, in a case where the honeycomb formed body is mounted on the abovementioned firing setter and thrown into a firing furnace, shift occurs between an upper surface of the firing setter and a lower end face of the honeycomb formed body due to the firing shrinkage of the honeycomb formed body, and defects such as deformation and crack of cell partition walls might be generated in a lower end face of a honeycomb structure which comes in contact with the firing setter. Additionally, sticking occurs between the lower end face of the honeycomb formed body and the upper surface of the firing setter, the shift or the like do not uniformly occur, and strain might occur in a shape of the lower end face of the honeycomb structure. In a case where the strain occurs, a roundness of the end face deteriorates in the round pillar-shaped honeycomb structure.

On the other hand, in a case where the above raw setter is used, the raw setter is made of the same material as in the honeycomb formed body of a firing object, and hence a firing shrinkage difference between the honeycomb formed body and the raw setter in the firing is not made. Therefore, the raw setter can perform a firing shrinkage along the cell longitudinal direction and a cross-sectional direction perpendicular to the cell longitudinal direction at the same timing and the same ratio as in the honeycomb formed body. Consequently, it is possible to eliminate a disadvantage in a case where the firing setter is used. However, the raw setter is not repeatedly usable, and also becomes a factor to increase firing cost in the firing of the honeycomb formed body.

Thus, the present invention has been developed in view of the above situation of the conventional technology, and an object thereof is to provide a manufacturing method of a honeycomb structure in which a setter is not used, so that it is possible to alleviate generation of a defect in an end face of the honeycomb structure and to suppress firing cost, and a honeycomb formed body for use in the manufacturing method.

According to the present invention, there are provided a manufacturing method of a honeycomb structure which achieves the above object, and a honeycomb formed body.

According to a first aspect of the present invention, a manufacturing method of a honeycomb structure is provided including a forming step of forming a forming raw material, and extruding, cutting and drying the material to form a honeycomb formed body having partition walls defining a plurality of cells which extend from one end face to the other end face and which become through channels for a fluid; a convex wall portion forming step of forming a convex wall portion projected from the vicinity of a circumferential edge of the one end face of the honeycomb formed body obtained by the forming step along a central axis direction of the honeycomb formed body, and processing the one end face so that its cross section has a concave shape; a mounting step of directing downward the side of the one end face on which the convex wall portion is formed, and mounting the honeycomb formed body on a shelf plate so that the convex wall portion abuts on a shelf plate surface; a firing step of firing the honeycomb formed body mounted on the shelf plate, to form a honeycomb fired body; and a circumference grinding step of grinding a circumferential surface of the honeycomb fired body obtained by the firing step, to remove the convex wall portion.

According to a second aspect of the present invention, the manufacturing method of the honeycomb structure according to the above first aspect is provided, further including a circumferential wall forming step of applying a circumference coating material to a circumference ground surface of the honeycomb fired body from which the convex wall portion is removed by the circumference grinding step, to form a circumferential wall.

According to a third aspect of the present invention, the manufacturing method of the honeycomb structure according to the above first or second aspects is provided, further including a communication hole forming step of forming a communication hole portion which communicates between a wall inner surface and a wall outer surface of the convex wall portion.

According to a fourth aspect of the present invention, the manufacturing method of the honeycomb structure according to any one of the above first to third aspects is provided, wherein a wall height of the convex wall portion from the one end face is from 0.7 to 3 mm.

According to a fifth aspect of the present invention, the manufacturing method of the honeycomb structure according to any one of the above first to fourth aspects is provided, wherein a wall width of the convex wall portion is from 3 to 15 mm.

According to a sixth aspect of the present invention, a honeycomb formed body for use in the manufacturing method of the honeycomb structure according to any one of the above first to fifth aspects is provided, including a convex wall portion projected from the vicinity of a circumferential edge of one end face along a central axis direction, wherein the one end face is processed so that its cross section has a concave shape.

According to a seventh aspect of the present invention, the honeycomb formed body according to the above sixth aspect is provided, wherein the convex wall portion further includes a communication hole portion which communicates between a wall inner surface and a wall outer surface.

According to a manufacturing method of a honeycomb structure of the present invention, the honeycomb structure suitably holding an end face can be manufactured without using a setter. Additionally, a honeycomb formed body of the present invention is usable in the above manufacturing method.

DESCRIPTION OF THE PREFERRED EMBODIMENTS

Figure 1:
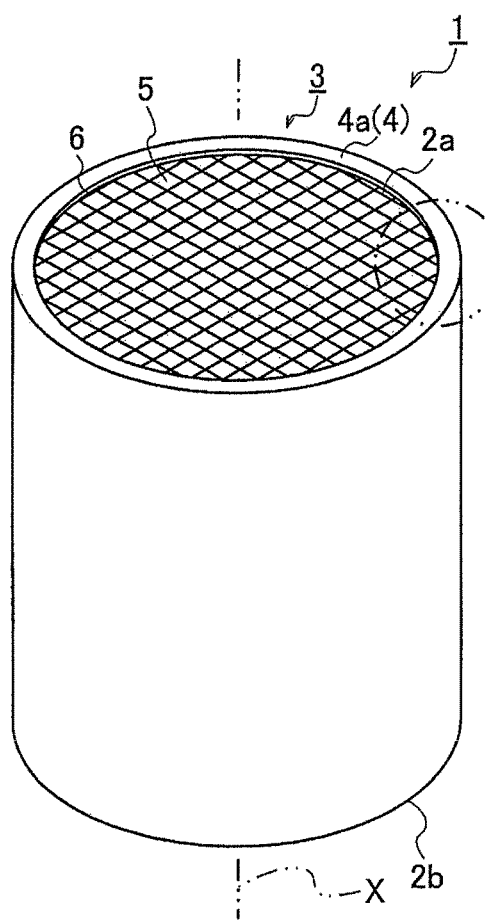
FIG. 1 is a perspective view showing a schematic constitution of a honeycomb formed body of the present embodiment.
Figure 2:
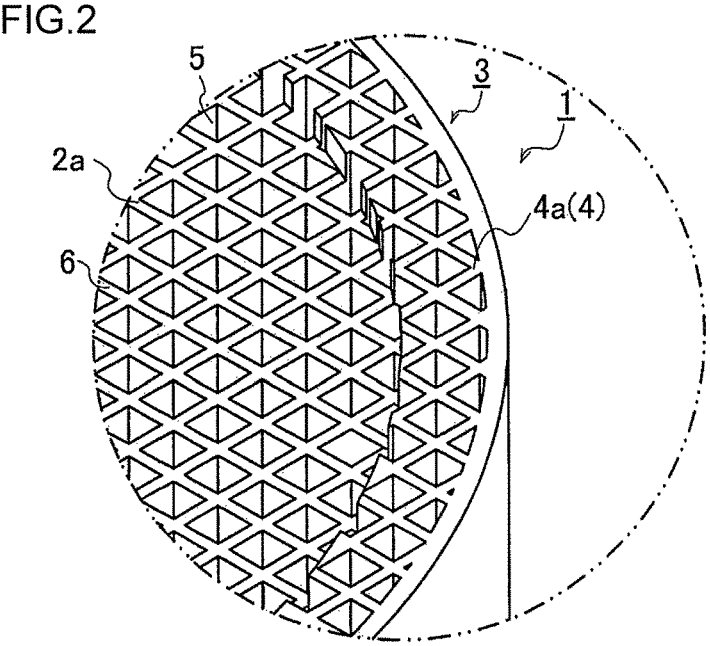
FIG. 2 is an enlarged perspective view showing a schematic constitution of the honeycomb formed body of a two-dot chain line circle region in FIG. 1.
Figure 3:
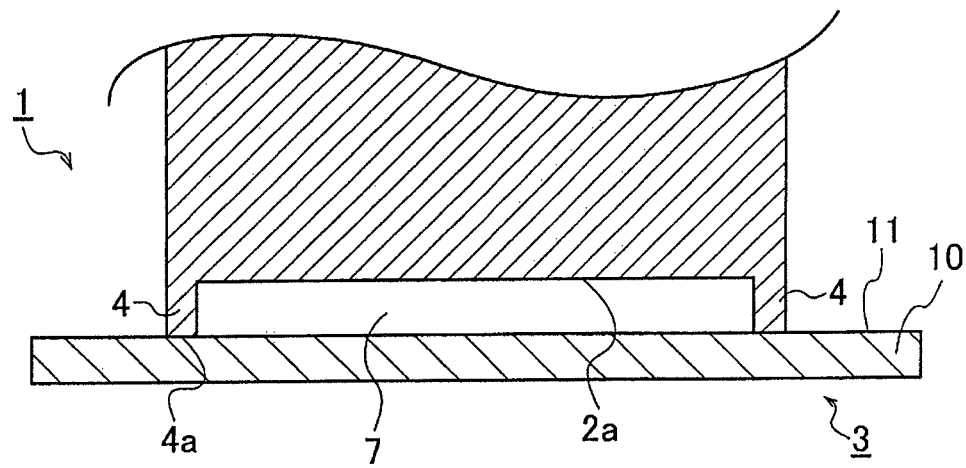
FIG. 3 is a partially enlarged cross-sectional view showing a schematic constitution of the honeycomb formed body mounted on a shelf plate.
Figure 4:
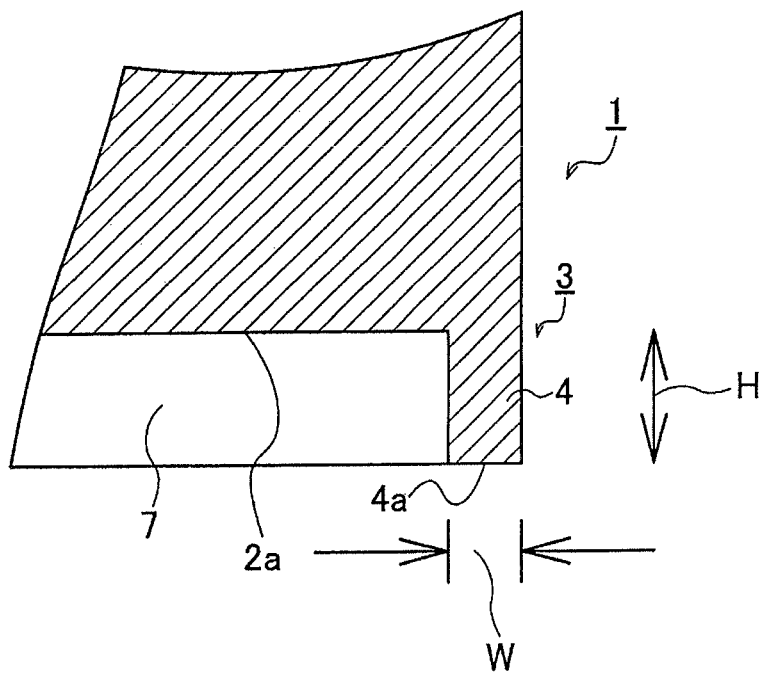
FIG. 4 is a partially enlarged cross-sectional view of the vicinity of an end face which shows the schematic constitution of the honeycomb formed body.

Hereinafter, embodiments of a manufacturing method of a honeycomb structure and a honeycomb formed body of the present invention will be described in detail with reference to the drawings. It is to be noted that the manufacturing method of the honeycomb structure and the honeycomb formed body of the present invention are not limited to the following embodiments, and various design changes, modifications, improvements and the like can be added without departing from the gist of the present invention. It is to be noted that in FIG. 1, FIG. 5, and FIG. 6, cells and partition walls appearing in an end face of the honeycomb formed body are partially omitted from the drawing.

As shown in FIGS. 1 to 4, a honeycomb formed body 1 of one embodiment of the present invention substantially possesses a round pillar shape as a whole, and has an annular convex wall portion 4 projected from the vicinity of a circumferential edge 3 of one end face 2a toward a central axis direction X (see FIG. 1). Consequently, the one end face 2a of the honeycomb formed body 1 is processed so that its cross section has a concave shape in which the vicinity of a center is dented. A manufacturing method 100 of a honeycomb structure in which the honeycomb formed body 1 is used will be described with reference to FIG. 5.

The honeycomb formed body 1 is obtained by preparing a forming raw material (a kneaded material) and extruding the material into a desirable shape by use of an extruder, and formed on the basis of a round pillar-shaped honeycomb formed body extruded by the extruder, cut into a predetermined length (raw cutting), dried and then finish-cut (a forming step). In the honeycomb formed body of the present embodiment, the one end face 2a of the above round pillar-shaped honeycomb formed body formed in the forming step is to grind and processed with a cup type grinding wheel or the like, and the vicinity of the center is ground at a predetermined grinding depth (a wall height H: see FIG. 4) to leave the vicinity of the circumferential edge 3 with a predetermined wall width W (see FIG. 4) from the circumferential edge (a convex wall portion forming step).

In consequence, the honeycomb formed body 1 is formed in which the vicinity of the circumferential edge 3 projects to the center of the one end face 2a. It is to be noted that FIG. 1 shows a state where the one end face 2a is directed upward, for simplicity of the drawing. Additionally, FIG. 5 similarly shows a state where the one end face 2a is directed upward, except a view (the second from the left) showing that the honeycomb formed body 1 is to be mounted on a shelf plate 10.

The honeycomb formed body 1 has a plurality of cells 5 which extend from the one end face 2a to the other end face 2b and which become through channels for a fluid and has latticed partition walls 6 defining the cells 5. Here, the wall height H from the center of the one end face 2a to a wall end 4a of the convex wall portion 4 is set to a range of 0.7 to 3 mm and further preferably a range of 1 to 3 mm. On the other hand, the wall width W of the convex wall portion 4 from the circumferential edge 3 toward a central direction is set to a range of 3 to 15 mm and further preferably a range of 4 mm to 8 mm.

Here, in a case where the wall height H is smaller than 0.7 mm, in an after-mentioned mounting step, a clearance space 7 between a shelf plate surface 11 of the shelf plate 10 and the vicinity of the center of the one end face 2a decreases, and there is the possibility that the one end face 2a comes in contact with a part of the shelf plate surface 11. On the other hand, in a case where the wall height H is larger than 3 mm, much time is required for the convex wall portion forming step of the formed body. Therefore, the wall height H is set to a range of 0.7 to 3 mm. In a case where the wall width W of the convex wall portion 4 is smaller than 3 mm, the convex wall portion 4 itself becomes a thin wall, thereby causing the possibility that honeycomb formed body 1 cannot sufficiently be supported. On the other hand, in a case where the wall width is larger than 15 mm, a grinding amount in an after-mentioned circumference grinding step increases, manufacturing cost increases, and hence it is difficult to efficiently manufacture the honeycomb structure.

The one end face 2a of the honeycomb formed body 1 formed through the forming step and the convex wall portion forming step is directed downward, and the honeycomb formed body is mounted on the shelf plate surface 11 of the shelf plate 10 (the mounting step). At this time, the clearance space 7 is made, as much as a distance corresponding to the wall height H of the convex wall portion 4, between the vicinity of the center of the one end face 2a and the shelf plate surface 11 by the convex wall portion 4 of the honeycomb formed body 1. That is, in a case where the honeycomb formed body 1 is mounted on the shelf plate 10, the one end face 2a does not entirely abut on the shelf plate surface 11. A firing step is performed in the state where the honeycomb formed body 1 is mounted on the shelf plate 10.

The shelf plate 10 for use is made of a heat resistant ceramic material, and does not cause a firing shrinkage even at a high firing temperature. Additionally, an area of the shelf plate surface 11 of the shelf plate 10 is formed to be larger than the one end face 2a of the honeycomb formed body 1. Consequently, the honeycomb formed body 1 mounted on the shelf plate 10 does not project from the shelf plate 10, i.e., has a state where the wall end 4a of the convex wall portion 4 on the side of the one end face 2a of the honeycomb formed body 1 entirely abuts on the shelf plate surface 11 (see FIG. 3).

Consequently, the honeycomb formed body 1 has the convex wall portion 4 in the vicinity of the circumferential edge 3, and is therefore disposed in a state where the vicinity of the center of the one end face 2a is floated above the shelf plate surface 11 of the shelf plate 10. That is, the honeycomb formed body is not influenced from the outside in the vicinity of the center of the one end face 2a.

The honeycomb formed body 1 mounted on the shelf plate 10 is thrown into a firing furnace, and fired at a predetermined firing temperature for predetermined firing time (the firing step). In consequence, the firing of the honeycomb formed body 1 is completed, and a honeycomb fired body 20 is formed. In the firing step, a ceramic raw material is sintered, and hence firing shrinkages are generated along a longitudinal direction (corresponding to the central axis direction X) of the honeycomb formed body 1 and a cross-section perpendicular to the longitudinal direction, respectively. At this time, the vicinity of the center of the one end face 2a of the honeycomb formed body 1 which is present at a position floated from the shelf plate surface 11 does not directly come in contact with the shelf plate 10 as described above, and there are not any factors that disturb the firing shrinkages. The other end face 2b becomes an upper surface during the firing and, therefore, is not restricted, and there are not any factors that disturb the firing shrinkages.

In consequence, the firing shrinkage is isotropically performed along the longitudinal direction and the cross section perpendicular to this longitudinal direction. That is, in the one end face 2a, there occurs, e.g., the disadvantage that the latticed partition walls 6 defining the cells 5 are deformed, but this disadvantage or the like does not occur in the vicinity of the center of the one end face 2a which does not abut on the shelf plate surface 11. As a result, in the one end face 2a of the honeycomb fired body 20 after the honeycomb formed body is fired, a defect or the like due to the deformation or crack of the partition walls 6 is not caused. In consequence, it is possible to eliminate a problem such as the defect in the firing step, and it is possible to form the honeycomb fired body 20 having a high quality such as a high shape stability.

Figure 5:
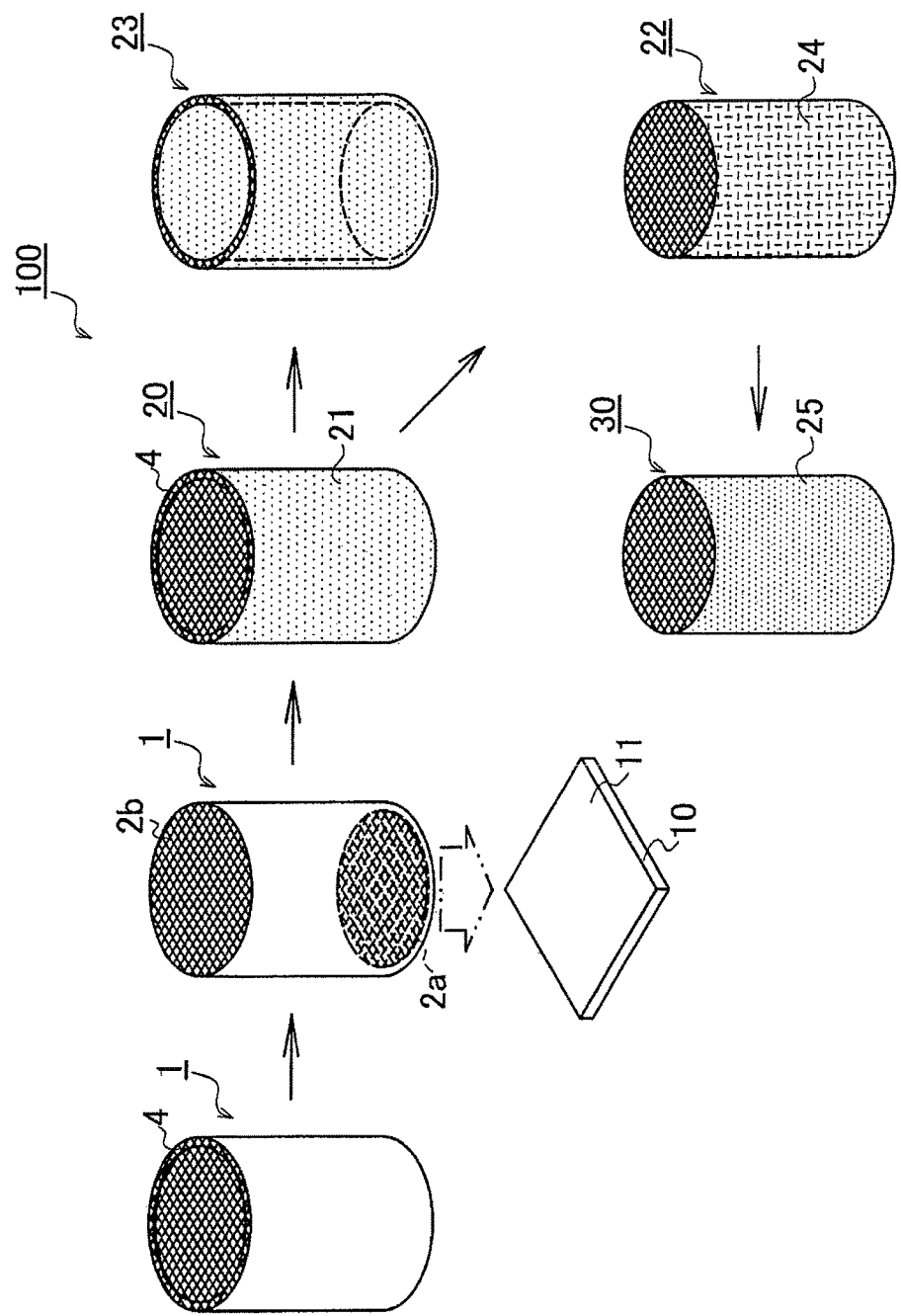
FIG. 5 is an explanatory view schematically showing a schematic constitution of a manufacturing method of a honeycomb structure of the present embodiment.

In the obtained honeycomb fired body 20, the convex wall portion 4 remains to be formed in the vicinity of the circumferential edge 3 (see FIG. 5). Thus, a grinding wheel (not shown) is brought close to a circumferential surface 21 while rotating the honeycomb fired body 20 based on the central axis direction X as a rotation axis, and a circumferential portion of the honeycomb fired body 20 including the circumferential surface 21 is ground and removed (the circumference grinding step). At this time, simultaneously with the grinding of the circumferential portion including the circumferential surface 21, the convex wall portion 4 communicating with the circumferential surface 21 is also ground and removed.

Furthermore, the above grinding of the circumferential surface 21 is continued up to a position at which all the convex wall portion 4 is removed, and a ground honeycomb fired body 22 is finally formed in which a portion corresponding to the wall width W of the convex wall portion 4 is ground. It is to be noted that FIG. 5 schematically shows, in its upper right, a ground and removed portion 23 including the convex wall portion 4 cut off by the grinding wheel. Afterward, a well-known circumference coating material is applied to a circumference ground surface 24 of the ground honeycomb fired body 22, to form a circumferential wall 25 (a circumferential wall forming step). The circumferential wall 25 is sufficiently dried to complete the manufacturing of the round pillar-shaped honeycomb structure 30. Here, the formation of the circumferential wall 25 is well known and hence its detailed description is omitted.

Figure 6:
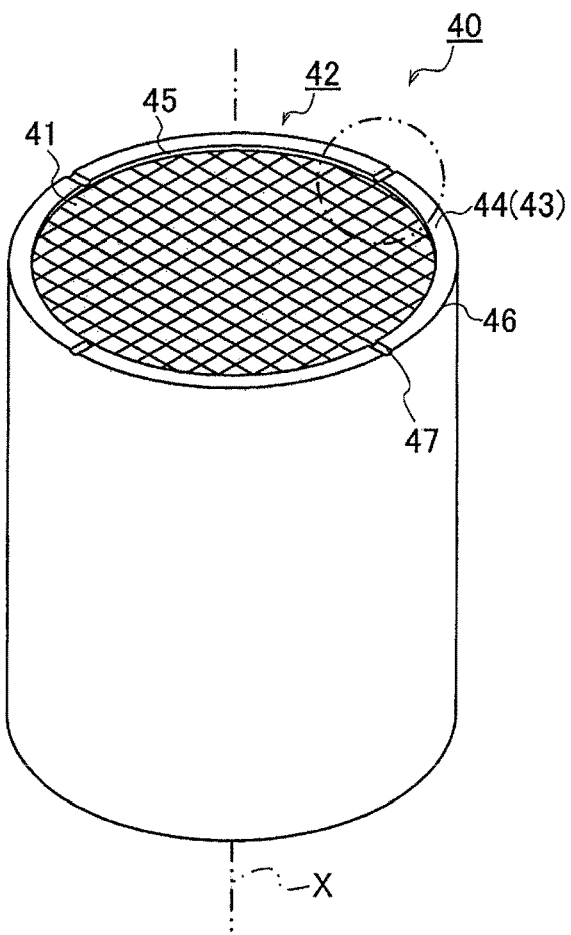
FIG. 6 is a perspective view showing a schematic constitution of the honeycomb formed body of another example constitution of the present invention.
Figure 7:
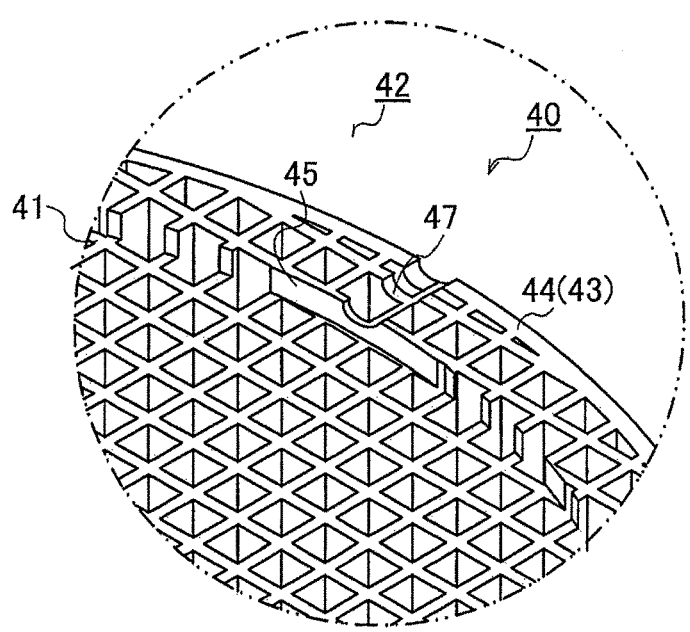
FIG. 7 is an enlarged perspective view showing a schematic constitution of the honeycomb formed body of a two-dot chain line circle region in FIG. 6.
Figure 8:
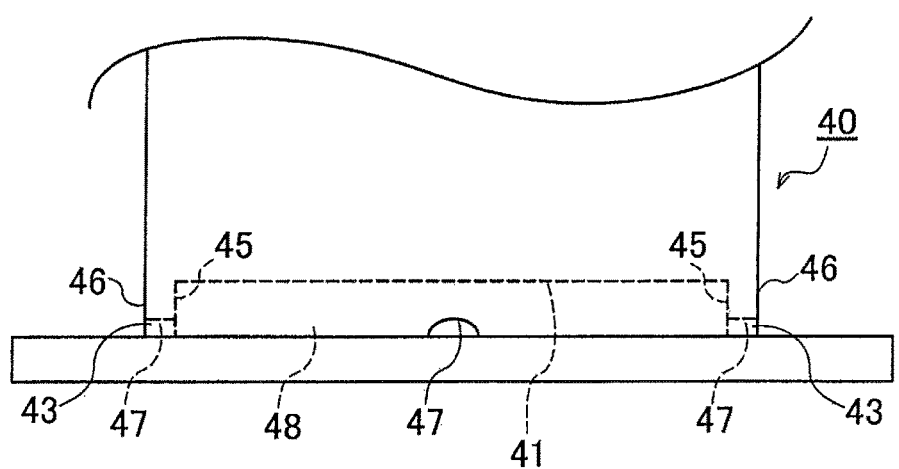
FIG. 8 is a partially enlarged explanatory view showing a schematic constitution of the honeycomb formed body of the other example constitution of FIG. 6 which is mounted on a shelf plate.

As another example constitution of the present invention, a honeycomb formed body 40 having a constitution shown in FIGS. 6 to 8 can be illustrated. FIG. 6 is a perspective view showing a schematic constitution of the honeycomb formed body of the other example constitution of the present invention, FIG. 7 is an enlarged perspective view showing a schematic constitution of the honeycomb formed body 40 of a two-dot chain line circle region in FIG. 6, and FIG. 8 is a partially enlarged explanatory view showing a schematic constitution of the honeycomb formed body 40 of the other example constitution of FIG. 6 which is mounted on a shelf plate 10.

As shown in FIGS. 6 to 8, the honeycomb formed body 40 of the other example constitution has an annular convex wall portion 43 projected from the vicinity of a circumferential edge 42 of one end face 41 toward a central axis direction X. In consequence, the one end face 41 of the honeycomb formed body 40 has a cross section possessing a concave shape in which the vicinity of a center is dented. In the convex wall portion 43, a part of a wall end 44 is hollowed out in a concave shape (a communication hole forming step), to form a communication hole portion 47 which communicates between a wall inner surface 45 facing the vicinity of the center and a wall outer surface 46 facing the outside.

Consequently, in a case where the one end face 41 is directed downward and the honeycomb formed body 40 of the other example constitution is mounted on a shelf plate surface 11 of the shelf plate 10, a firing atmosphere can freely flow into a clearance space 48 formed between the shelf plate surface 11 of the shelf plate 10 and the vicinity of the center of the one end face 41, and flow out from the honeycomb formed body 40.

In a case where the clearance space 48 is completely cut off from outside air during a firing step, at an early stage of the firing step, evaporation or burning of an organic binder included in the honeycomb formed body does not uniformly proceed, and in a sintering process of a ceramic raw material, sintering does not uniformly proceed due to a temperature difference between an upper surface and a lower surface of the honeycomb formed body and a temperature difference between a central portion and a circumferential portion, which might cause crack due to a difference in dimensional change. In the honeycomb formed body 40 of the other example constitution of the present invention, the firing atmosphere is passed between the clearance space 48 and an upper surface side of the honeycomb formed body 40 through the communication hole portion 47, so that the above disadvantage can be eliminated. It is to be noted that the communication hole portion 47 is not limited to the abovementioned communication hole portion formed by hollowing out a part of the wall end 44 in the concave shape, and may be such a through hole extending through a space between the wall inner surface 45 and the wall outer surface 46. As described above, there is not any special restriction on the constitution as long as the firing atmosphere can be passed between the clearance space 48 and the outside as described above.

In a case where a large-size honeycomb structure is manufactured, when a forming raw material is extruded in a horizontal direction, deformation of the whole honeycomb formed body or deformation of cells on a lower surface side of the honeycomb formed body inevitably occurs due to an own weight of the honeycomb formed body. For the purpose of removing these deformations and keeping a dimensional accuracy of the honeycomb structure, a circumferential portion is ground and processed after the honeycomb formed body is fired. Simultaneously with the circumference grinding, the above convex wall portion can be removed, and hence the present invention is especially effective for the manufacturing of the large-size honeycomb structure.

Hereinafter, the honeycomb formed body of the present invention and the manufacturing method of the honeycomb structure in which this honeycomb formed body is used will be described on the basis of the following examples, but the honeycomb formed body of the present invention and the manufacturing method of the honeycomb structure are not limited to these embodiments.

EXAMPLES (1) Forming Step and Convex Wall Portion Forming Step

A plurality of honeycomb formed bodies were prepared in each of which one end face had a convex wall portion and a wall height H and a wall width W matched the above ranges, respectively, by forming steps and convex wall portion forming steps in which the same kneaded material was used and forming conditions and the other conditions were constant (Examples 1 to 14). Furthermore, there were prepared honeycomb formed bodies (Comparative Examples 1 and 2) in each of which a wall height H in the above parameters departed from the above conditions, and a honeycomb formed body (Comparative Example 3) in which a wall width W departed from the above conditions. Additionally, there were prepared conventional honeycomb formed bodies (Comparative Examples 4 to 9) each of which did not have any convex wall portions.

(2) Mounting Step and Firing Step

A surface of each prepared honeycomb formed body in which the convex wall portion was present was directed downward, and the honeycomb formed body was directly mounted on a shelf plate surface of a shelf plate made of a ceramic material. Additionally, in each of Comparative Examples 7 to 9, a pressed setter was interposed between the shelf plate surface and the honeycomb formed body. In such states, the shelf plate and the honeycomb formed body were thrown into a firing furnace. Additionally, respective firing conditions such as firing time and firing temperature were the same conditions in Examples 1 to 14 and Comparative Examples 1 to 9, respectively.

(3) Circumference Grinding Step and Formation of Circumferential Wall

To each of honeycomb fired bodies of Examples 1 to 14 and Comparative Examples 1 to 3 which were obtained in the above (2), a circumference grinding step was performed, and the convex wall portion was removed. The circumference grinding step was also performed to each of honeycomb fired bodies of Comparative Examples 4 to 9. Afterward, a circumferential wall was formed, to prepare a honeycomb structure. As to the obtained honeycomb structure, evaluation was carried out concerning the following items.

(4) Evaluation Items (Partition Wall Crack and Partition Wall Deformation)

A shape of an end face of the honeycomb structure was visually confirmed, and presence/absence of partition wall crack and presence/absence of partition wall deformation caused in the end face of the honeycomb structure by a firing shrinkage were visually judged, respectively. Additionally, as to standards of these judgments, a case where the crack or the deformation was not recognized was defined as a suitable state and evaluated as "A", a case where a deformation amount was small was defined as an allowable state and evaluated as "B", a case where the deformation or the crack was noticeably recognized was defined as the outside of the allowable range and evaluated as "C", and three stages of evaluations were carried out in this way. According to such evaluation items, it is possible to grasp a correlation between the honeycomb formed body of the present invention and the partition wall crack and partition wall deformation in a case where the honeycomb formed body is directly mounted on the shelf plate.

(5) Evaluation Item (Flatness)

A flatness in the end face of the honeycomb structure was measured. Here, the flatness is a difference between a maximum value and a minimum value in a case where the end face of the honeycomb structure is directed downward, the honeycomb structure is disposed on a flat plate, and a height of the end face to the flat plate in a vertical direction to the flat plate is measured. A case where a value of such flatness was 0.80 mm or less was evaluated as "A", a case where the value was from 0.81 mm to 1.00 mm was evaluated as "B", a case where the value was 1.01 mm or more was evaluated as "C", and three stages of evaluations were carried out in this way. In consequence, the deformation amount of the end face of the honeycomb structure to a central axis direction (a longitudinal direction) in the firing shrinkage can be evaluated.

Table 1 mentioned below shows an outer diameter, a length, a partition wall thickness and a cell density of each of the honeycomb formed bodies of Examples 1 to 14 and Comparative Examples 1 to 9, a wall height H and a wall width W of the convex wall portion of the honeycomb formed body, and further, conclusions of the evaluation items to each obtained honeycomb structure. In Table 1, cpsi (cells per square inch) indicating the cell density is the number of the cells per square inch.

TABLE 1

| | Honeycomb formed body | | | | |
|---|---|---|---|---|---|
| | Mounting method | Outer dia./mm | Length/mm | Partition wall thickness/mm (mil) | Cell density/ cells/cm² (cpsi)* |
| Example 1 | Directly mounted on shelf plate | 282 | 203 | 0.1 (4) | 62 (400) |
| Example 2 | Directly mounted on shelf plate | 282 | 203 | 0.1 (4) | 62 (400) |
| Example 3 | Directly mounted on shelf plate | 282 | 203 | 0.1 (4) | 62 (400) |
| Example 4 | Directly mounted on shelf plate | 282 | 203 | 0.1 (4) | 62 (400) |
| Example 5 | Directly mounted on shelf plate | 282 | 203 | 0.1 (4) | 62 (400) |
| Example 6 | Directly mounted on shelf plate | 282 | 203 | 0.1 (4) | 62 (400) |
| Example 7 | Directly mounted on shelf plate | 282 | 203 | 0.1 (4) | 62 (400) |
| Example 8 | Directly mounted on shelf plate | 282 | 203 | 0.1 (4) | 62 (400) |
| Example 9 | Directly mounted on shelf plate | 373 | 203 | 0.125 (5) | 47 (300) |
| Example 10 | Directly mounted on shelf plate | 373 | 203 | 0.125 (5) | 47 (300) |
| Example 11 | Directly mounted on shelf plate | 295 | 203 | 0.15 (6) | 62 (400) |
| Example 12 | Directly mounted on shelf plate | 295 | 203 | 0.15 (6) | 62 (400) |
| Example 13 | Directly mounted on shelf plate | 295 | 203 | 0.15 (6) | 62 (400) |
| Example 14 | Directly mounted on shelf plate | 295 | 203 | 0.15 (6) | 62 (400) |
| Comparative Example 1 | Directly mounted on shelf plate | 282 | 203 | 0.1 (4) | 62 (400) |
| Comparative Example 2 | Directly mounted on shelf plate | 282 | 203 | 0.1 (4) | 62 (400) |
| Comparative Example 3 | Directly mounted on shelf plate | 373 | 203 | 0.125 (5) | 47 (300) |
| Comparative Example 4 | Directly mounted on shelf plate | 282 | 203 | 0.1 (4) | 62 (400) |
| Comparative Example 5 | Directly mounted on shelf plate | 373 | 203 | 0.125 (5) | 47 (300) |
| Comparative Example 6 | Directly mounted on shelf plate | 295 | 203 | 0.15 (6) | 62 (400) |
| Comparative Example 7 | Pressed setter | 282 | 203 | 0.1 (4) | 62 (400) |
| Comparative Example 8 | Pressed setter | 373 | 203 | 0.125 (5) | 47 (300) |
| Comparative Example 9 | Pressed setter | 295 | 203 | 0.15 (6) | 62 (400) |

| | Convex wall portion | | Evaluation item | | |
|---|---|---|---|---|---|
| | Wall height H/mm | Wall width W/mm | Partition wall crack | Partition wall deformation | Flatness |
| Example 1 | 1 | 3 | A | B | A |
| Example 2 | 1 | 4 | A | A | A |
| Example 3 | 1 | 5 | A | A | A |
| Example 4 | 1 | 6 | A | A | A |
| Example 5 | 1 | 8 | A | A | A |
| Example 6 | 0.7 | 8 | A | B | A |
| Example 7 | 3 | 8 | A | A | A |
| Example 8 | 3 | 10 | A | A | A |
| Example 9 | 1 | 3 | A | B | A |
| Example 10 | 1 | 8 | A | A | A |
| Example 11 | 1 | 3 | A | B | A |
| Example 12 | 1 | 8 | A | A | A |
| Example 13 | 0.7 | 8 | A | B | A |
| Example 14 | 3 | 8 | A | A | A |
| Comparative Example 1 | 0.3 | 8 | A | C | B |
| Comparative Example 2 | 0.5 | 8 | A | C | B |
| Comparative Example 3 | 1 | 2 | A | C | B |
| Comparative Example 4 | — | — | B | C | B |
| Comparative Example 5 | — | — | C | C | C |

TABLE 1-continued

|  |  |  | | | |
|---|---|---|---|---|---|
| Comparative Example 6 | — | — | B | C |  |
| Comparative Example 7 | — | — | A | C | C |
| Comparative Example 8 | — | — | A | C | C |
| Comparative Example 9 | — | — | A | C | C |

*Notes: cpsi = cells per square inch

Considerations: Examples 1 to 14)

As shown in Table 1, in a case where each of parameters such as a wall height H and a wall width W was in a range defined in the honeycomb formed body of the present invention, a suitable evaluation was obtained in any one of evaluation items such as partition wall crack, deformation and flatness. Consequently, it has been confirmed that the honeycomb formed body of the present invention except a convex wall portion and its periphery can isotropically perform a firing shrinkage in a firing step and any restrictions due to the firing shrinkage are not generated between the vicinity of a center of one end face of the honeycomb formed body and a shelf plate surface of a shelf plate.

Especially, even when the wall height H was 0.7 mm, it was possible to obtain the suitable evaluation. Additionally, even in a case where an outer diameter of the honeycomb formed body was changed, any special changes were not recognized. However, in any case where the wall width W was 3 mm (Examples 1, 9 and 11), the evaluation of the partition wall deformation was "B". Therefore, it is considered that the honeycomb structure is especially suitably formed with the wall width W of at least 4 mm.

Considerations: Comparative Examples 1 to 9)

On the other hand, in any case where a wall height H was set to 0.5 mm or less (Comparative Examples 1 and 2), partition wall deformation was evaluated as "C", and a flatness was evaluated as "B". That is, it has been continued that in the case where the wall height H is 0.5 mm or less, there is the possibility that a shelf plate surface comes in contact with the vicinity of a center of an end face of a honeycomb formed body, and there is a factor to restrict a firing shrinkage in a firing step. Additionally, it has been confirmed that due to the contact with the shelf plate surface, the flatness deteriorates. Furthermore, in a case where a wall width W was set to 2 mm, partition wall deformation was evaluated as "C", and there was a tendency similar to that in Examples 1, 9 and 11 mentioned above. That is, it is confirmed again in Comparative Example 3 that the wall width W needs to be at least 3 mm and more preferably 4 mm or more.

In each of Comparative Examples 4 to 9, differently from the honeycomb formed body of the present embodiment, a honeycomb formed body did not have a convex wall portion, and the conventional honeycomb formed body was mounted on a shelf plate (Comparative Examples 4 to 6) or a pressed setter (Comparative Examples 7 to 9) and fired, a firing shrinkage was caused between an end face of the honeycomb formed body and the shelf plate or the pressed setter, and generation of partition wall crack, deformation of the end face and deterioration of a flatness were confirmed.

As shown in Examples 1 to 14 and Comparative Examples 1 to 9 mentioned above, when there is used a honeycomb formed body of conditions satisfying parameters such as a wall height H of at least 0.7 mm and further preferably 1 mm or more and 3 mm or less and a wall width W of 3 mm or more and further preferably from 4 mm to 8 mm, a honeycomb structure in which partition walls of cells are not deformed and a flatness is high can be manufactured without using a setter. That is, the setter does not have to be used, and it is possible to reduce setter cost and to omit a step of mounting the honeycomb formed body on the setter.

A manufacturing method of a honeycomb structure of the present invention and a honeycomb formed body are usable in manufacturing of the honeycomb structure which can be utilized in a car exhaust gas purifying catalyst carrier, a diesel particulate removing filter, a heat reservoir for a burning device, or the like.

DESCRIPTION OF REFERENCE NUMERALS

1 and 40: honeycomb formed body, 2a and 41: one end face, 2b: the other end face, 3 and 42: circumferential edge, 4 and 43: convex wall portion, 4a and 44: wall end, 5: cell, 6: partition wall, 7 and 48: clearance space, 10: shelf plate, 11: shelf plate surface, 20: honeycomb fired body, 21: circumferential surface, 22: ground honeycomb fired body, 23: ground and removed portion, 24: circumference ground surface, 25: circumferential wall, 30: honeycomb structure, 45: wall inner surface, 46: wall outer surface, 47: communication hole portion, 100: manufacturing method of the honeycomb structure, H: wall height, W: wall width, and X: central axis direction.

What is claimed is:
1. A manufacturing method of a honeycomb structure comprising:
   a forming step of forming a forming raw material, and extruding, cutting and drying the material to form a honeycomb formed body having partition walls defining a plurality of cells which extend from one end face to the other end face and which become through channels for a fluid;
   an annularly projected wall portion forming step of forming a wall portion annularly projected from the vicinity of a circumferential edge of the one end face of the honeycomb formed body obtained by the forming step along a central axis direction of the honeycomb formed body, and processing the one end face so that a cross section along the central axis direction has a hollowed shape;
   a mounting step of directing downward the side of the one end face on which the annularly projected wall portion is formed, and mounting the honeycomb formed body on a shelf plate so that the annularly projected wall portion abuts on a shelf plate surface;
   a firing step of firing the honeycomb formed body mounted on the shelf plate, to form a honeycomb fired body; and a circumference grinding step of grinding a circumferential surface of the honeycomb fired body obtained by the firing step, to remove the annularly projected wall portion.

2. The manufacturing method of the honeycomb structure according to claim 1, further comprising:

a circumferential wall forming step of applying a circumference coating material to a circumference ground surface of the honeycomb fired body from which the annularly projected wall portion is removed by the circumference grinding step, to form a circumferential wall.

3. The manufacturing method of the honeycomb structure according to claim 1, further comprising:

a communication hole forming step of forming a communication hole portion which communicates between a wall inner surface and a wall outer surface of the annularly projected wall portion.

4. The manufacturing method of the honeycomb structure according to claim 1, wherein a wall height of the annularly projected wall portion from the one end face is from 0.7 to 3 mm.

5. The manufacturing method of the honeycomb structure according to claim 1, wherein a wall width of the annularly projected wall portion is from 3 to 15 mm.

* * * * *